Nov. 20, 1962  J. POS  3,064,354
DEVICES AND METHODS FOR DENTAL BITES AND IMPRESSIONS
Filed Dec. 3, 1959
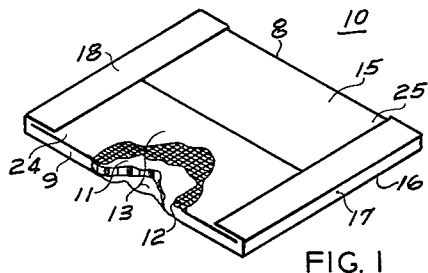
FIG. 1
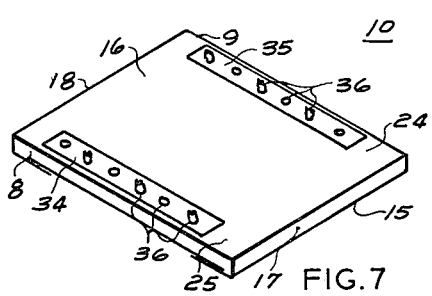
FIG. 7
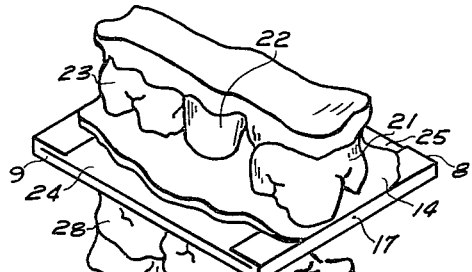
FIG. 2
FIG. 7A
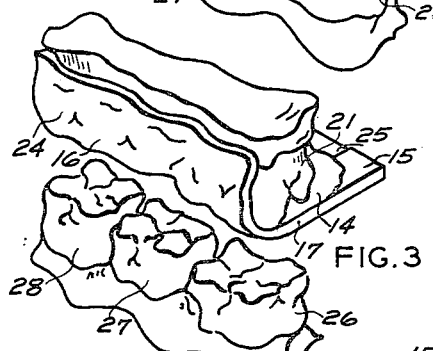
FIG. 3
FIG. 8
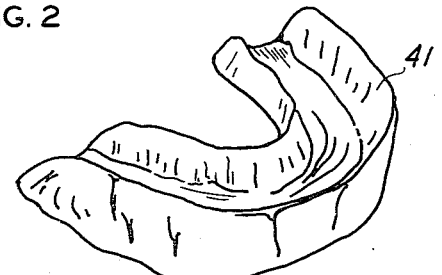
FIG. 5
FIG. 4
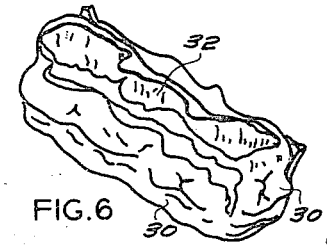
FIG. 6
JULIUS POS
INVENTOR
BY  *Irving Kayton*
ATTORNEY United States Patent Office 3,064,354
Patented Nov. 20, 1962

3,064,354
DEVICES AND METHODS FOR DENTAL BITES
AND IMPRESSIONS
Julius Pos, Blauvelt, N.Y., assignor of ten percent to
Irving Kayton
Filed Dec. 3, 1959, Ser. No. 857,062
8 Claims. (Cl. 32—19)

This invention relates to dental bites and impressions for crowns, bridges, inlays and the like, and more particularly to devices, and to methods used in conjunction with the devices, for forming such bites, or impressions, or both.

The function of taking a bite is to obtain an accurate reproduction of the patient's occlusal register so that the artificial replacement that is to be produced may occupy precisely the same position relative to the opposing teeth and adherent teeth as did the original tooth. Unless the bite is accurate, the artificial replacement constructed by the dentist, or the dental laboratory, will have to be filed, or built up, by the dentist to cure the defect of too high or too low a contact point, respectively, or to form an accurate occlusal registration.

It is an object of this invention to provide a method and means for forming a completely accurate dental bite, which heretofore has not been possible in the art.

It is an advantage of this invention that the dentist may exercise complete, direct, and positive control of the accuracy of the bite during each step of the bite taking process.

Heretofore, the taking of a bite and of an impression have required two separate and distinct processes utilizing separate and distinct means for each. It is a feature of this invention that the means used for taking the bite is the same as that for taking an impression and it is another advantage of this invention that both the bite and impression may be made in one process.

It is yet another feature of this invention that any type of impression material may be used, it being compatible both with rubber impression material or hydrocolloid.

The invention will best be understood with reference to and in consideration of, the various illustrative embodiments and processes shown in the accompanying drawings and in the following detailed description thereof.

In the drawings:

FIG. 1 is an illustrative example of a preferred embodiment of a bite envelope in accordance with the invention;

FIGS. 2, 3 and 4 show a progression of steps in a method for using the envelope of FIG. 1 for a bite and impression;

FIG. 5 is a completed bite using the envelope of FIG. 1 and the method of FIGS. 2, 3 and 4;

FIG. 6 is a completed combined bite and impression using the bite of FIG. 5;

FIGS. 7 and 7A show a variation of the embodiment of FIG. 1 particularly adapted for use with hydrocolloid impression material, and FIG. 8 is an illustrative example of the envelope in accordance with the invention in the form of a fulltray.

The Dental Bite Envelope

FIG. 1 is an illustrative embodiment, given by way of example, of a preferred device useful in the processes for taking bites, impressions, or both, in accordance with the principles of the invention. The planar device of FIG. 1, hereinafter called the bite envelope 10, comprises a thin, planar, rectangular sheet 11 of dental bite wax, which, in its usual commercial form comes in large sheets, red or pink in color, and is readily deformable by opposing teeth biting into the sheet in normal occlusion. Contiguous to one face of, and of the same rectangular size and shape as wax sheet 11, is a cloth gauze layer 12. Completely surrounding wax sheet 11 and gauze 12, and contiguous to both, is an aluminum foil envelope 13. Thus foil 13 forms an envelope within which is contained the wax sheet 11 and gauze 12. The envelope, formed by folding the aluminum foil ends over, as indicated in FIG. 1, is prevented from opening by glueing the folded ends with any appropriately adhesive glue, but which is light and thin, such as mucilage. Alternatively a metal staple may be used to secure the end from opening, but taking care to place it near an edge and in an area where the patient will not be biting.

The entire structure consisting of the wax sheet 11, gauze 12 and aluminum foil 13, will hereinafter be referred to as bite envelope 10. The length and width of envelope 10 will be determined by the size and number of teeth of which a bite and/or impression is to be taken. The width should be at least equal to the sum of the following lengths: The length formed from the gingival margin to the occlusal edge of the labial face of the tooth, from the gingival margin to the occlusa ledge of the lingual face, and from the lingual to labial edges of the occlusal face. In other words, the width of envelope 10 should be at least great enough so that it may be wrapped about the lingual—occlusal—labial faces of a tooth from gingival margin on the labial side to gingival margin on the lingual side. The length of envelope 10 should be equal to the length formed by the teeth of which the bite and/or impression is to be made plus at least the mesial—distal distance across the occlusal face of one more tooth. The reason for at least this extra distance will be discussed below in connection with FIG. 2.

For purposes of exposition the top face 15 of envelope 10 will be the face used against the upper teeth 21—23 for which the impression is to be taken while the lower face 16 of envelope 10 will be used against the opposing teeth 26—28.

Method for Taking the Combined Bite and Impression

The envelope 10 is heated over a flame to soften the bite wax sheet 11 contained therein. Since aluminum foil 13 is flame-proof a direct flame may be used on it to soften the wax 11. If, however, some other metal foil is used which is inflammable, such as tin foil, then hot water may be used to soften the wax within the envelope 10. Since the wax 11 is within the envelope, it may be softened even to the point of flowing and still remain in its planar shape because of the vessel-like or envelope function of the surrounding metal foil 13. Indeed, it has been ascertained that even if the aluminum foil leaves the bite wax 11 exposed at two edges, such as at edges 17 and 18, the bite wax will not run out of the envelope to any substantial extent although it may have been heated enough to cause the wax to flow.

A layer of hard inlay wax 14 sometimes called blue Kerr wax, is placed in a soft condition (obtained by heating over a flame) solely on top surface 15 of envelope 10. Envelope 10 with the blue inlay wax on top of it is heated over a flame to soften it. As shown in FIG. 2, the envelope 10 is placed in horizontal position, between the teeth of the patient with the teeth about midway between the edges 8 and 9 of the envelope 10 and the patient instructed to bite. When envelope 10 is placed in the patient's mouth care is taken to line up an edge of the envelope with a reference point since the envelope will be removed from and replaced into, the mouth more than once and it is essential that the same position be reestablished each time. The registration of the bite in the wax will also assist in bringing envelope 10 back in proper position each time. Thus in FIG. 2, the edge 17 of the envelope is placed to correspond with the mesial edge of tooth 21 and this is the reference point. In FIG. 2, prepared tooth 22, adjacent tooth 21, has been prepared for a crown.

With the patient still biting envelope 10, the flange 24 of the envelope is firmly pressed up against the labial surface of the upper teeth 21—23, so that there is a demarcation of these teeth in surfaces 15 and 16 of the flange 24 of the envelope 10 as shown in FIG. 3, and with a cool water spray, cooled off in position in the mouth. After noting, once again, the position of the edge 17 relative to tooth 21, the envelope is removed from the patient's mouth and cooled to harden both the bite wax and the inlay wax. At this point the demarcation of the occlusal and labial surfaces of teeth 21—23 are fixed in envelope 10. Gauze 12 (shown in FIG. 1) functions to give bite envelope 10 body to help prevent the opposing teeth from biting completely through envelope 10. Other thin resistant materials may be used in lieu of gauze to perform the same function.

Flange 25 of envelope 10 is then heated over a flame to soften bite wax 11 and inlay wax 14 solely in the area of flange 25. Envelope 10 is carefully repositioned in the patient's mouth, and without letting the patient bite, flange 25 is firmly pressed upward against the lingual surfaces of teeth 21—23 as shown in FIG. 4. The patient is then directed to articulate the teeth thereby eliminating any possible inaccuracy in the bite which may have resulted in manipulating the lingual flange 25. A cool water spray is applied to the envelope 10 in the mouth, and then the envelope is removed from the patient's mouth and is cooled further. Thus far there has been achieved an accurate bite and impression, and the desired reproduction of the upper teeth. Until this point, however, there has been only a demarcation of the lower teeth in envelope 10; the following procedure is used for getting more details of the lower teeth.

A layer of inlay wax 29 in its soft condition is then applied to the area containing the demarcation of the occlusal surfaces of opposing teeth 26—28 in surface 16 of the envelope 10. If an impression is also to be made, and it is to be made with rubber impression material, care should be taken when applying the inlay wax to keep the flange 24 and 25 regions of surface 16 free of the inlay wax 29 as shown in FIG. 5, since the rubber impression material later to be used requires a metal surface for adhesion. The bite envelope 10 is reinserted in the patient's mouth in the proper position relative to the reference point, and the patient instructed to articulate the teeth together. This provides an accurate detail of the opposing teeth in wax 29 and envelope 10. The bite envelope 10 is cooled as described previously. At this point an extremely accurate bite has been produced providing a reproduction of all the details of an accurate occlusion and mesial and distal contact points as shown in FIG. 5.

It is important to note that direct and positive control of the accuracy of the bite is retained by the dentist throughout the bite process. Furthermore, the flaring and stretching of the bite wax in accordance with the prior art methods do not occur when using the bite envelope of this invention because of the thinness of the sheet of bite wax that is used.

If further detail is desired in the bite this may be readily obtained by using impression material in additional steps which will now be described; these steps complete the taking of the impression and increase the accuracy of the bite even more.

All areas of envelope 10, especially whereat the aluminum foil 13 is still exposed, such as the lower surface 16 of flanges 24—25, are lubricated with the adhesive liquid used with typical rubber liquid impression material. This is permitted to dry; then a batch of rubber impression material is mixed. The bite envelope 10 is then completely covered with, and the concave volume formed by flanges 24—25 and surface 15 is filled with, the rubber impression material. The bite envelope covered with rubber impression material is reinserted in the proper position in the patient's mouth relative to the reference point and the patient instructed to bite in normal occlusion. After the usual drying time the rubber impression material 30 will have hardened and the combined bite-impression is removed from the mouth in the condition shown in FIG. 6. The bite and impression may then be poured out and articulated in the usual way.

*Method for Taking An Impression Without a Bite*

The envelope 10 may be used as a tray for taking an impression without a bite, as would appropriately be the case when making a temporary plastic crown. Precisely the same procedure is followed as was described above, except that the use and need for the blue inlay wax 14 and 29 is eliminated, since its use is primarily for purposes of accuracy in the bite; and the impression is taken before the tooth is prepared. The patient, therefore bites into envelope 10 directly. An impression in rubber material is thus obtained which is the same as that of FIG. 6, except that wax 14 and 29 is no longer present and the demarcation from tooth 22 is that of a tooth prior to preparation.

The tooth may then be ground and prepared for a crown in standard manner such as tooth 22. Dental plastic in its soft state is inserted into the demarcation 32, FIG. 6, previously formed by the tooth 22 prior to its having been prepared for the crown. The plastic filled impression is then reinserted in the patient's mouth over the prepared tooth 22 and he is instructed to bite in normal occlusion. The soft plastic is permitted to harden, and the plastic is then in the form of a temporary crown which may be cemented to the prepared tooth 22.

The use of hydrocolloid as an impression material is sometimes desirable. However, hydrocolloid will not adhere to the smooth metal foil of the bite envelope as does the adhesive liquid of rubber impression material, but rather requires a physical irregularity in the tray in order to be properly anchored. Accordingly, several holes may be punched through the bite envelope 10 near the edges 8 and 9 of flanges 24 and 25 to serve as retention means for the hydrocolloid. The most appropriate times to make the punctures are just before the times envelope 10 is cooled after having pressed flanges 24 and 25 against the labial and lingual faces respectively, of teeth 21—23. In lieu of punching holes into envelope 10 little metal reinforcement strips 34 and 35 with holes already punched into them, as shown in FIGS. 7 and 7A, may be pressed into envelope 10 along edges 8 and 9 as shown in FIG. 7. The ragged edges of the holes 36 formed by punching through the metal strips 34 and 35 serve the two-fold function of securing the strip to envelope 10 by digging into wax 11 thereof, and on the other side of the strip, forming retention means for the hydrocolloid. If holes are punched into the envelope, or the punched strips 34 and 35 are used, it would of course be desirable to use a bite envelope 10 which is slightly wider than would ordinarily be needed when rubber impression material is used, so that there is no interference with the impression of the lingual and labial surfaces near the gingival margin.

When using hydrocolloid impression material the strips 34 and 35 constitute the means for securing the hydrocolloid to the envelopes. When using the rubber impression material the metal foil 13 performs this function, but if strips 34 and 35 are used the adhesive liquid usually used with rubber impression material may be dispensed with since the strips will serve to secure the rubber material.

An alternative arrangement is to use the wax sheet 11 without gauze 12 and without metal foil 13, but with the metal reinforcement strips pressed directly into the wax sheet 11. In such an arrangement, the bite device appears as in FIG. 7 but with metal foil 13 removed (it being understood that the best method is to apply the strips 34 and 35 to the wax sheet 11 at selected times in the impression-taking process as previously described). In such an arrangement, however, the previously described advantage of having the metal foil 13 form a vessel-like envelope which will maintain the shape of bite wax 11 when it is melted in anticipation of modulation, is lost.

In the foregoing discussion the invention has been applied to a bite and/or impression for a single crown construction. However, precisely the same devices and methods are to be used when making a bridge or several crowns. In such cases a longer bite envelope is required, i.e., the distance between edges 17 and 18 in FIGS. 1 or 7 should be increased such that all the teeth of interest can be accommodated on bite envelope 10. Furthermore, it is by no means essential that the outline of envelope 10 be rectangular, although this is a very convenient shape which lends itself readily to mass production, but may be varied in accordance with the outline of the jaw into appropriate oval or curved shapes. The use of a special shape is very advantageous in the embodiment now to be described.

*Bite and Impression Envelope in Full Tray Form*

In rehabilitation cases where extensive bridgework is required a bite and impression of the whole mouth is indicated. This may readily be accomplished in accordance with the invention by using a bite and impression envelope having a shape appropriate for the whole mouth.

It has been found that a bite and impression envelope in the form of a full tray 41, as shown in FIGURE 8, is particularly advantageous. This envelope tray 41 has an internal sheet of soft bite wax, a layer of gauze, with both the wax and gauze enveloped by metal foil in the same arrangement as the planar bite envelope 10 of FIG. 1.

The use of the envelope tray 41 in taking a bite and impression is the same as heretofore described with some modifications. Because of the large size of the tray it would be difficult to soften, and keep soft, enough hard inlay wax to be placed on the outside biting surfaces of the tray. For this reason a more pliable wax is used in lieu of the hard inlay wax. An appropriate type is the green Kerr dental wax. Furthermore, it is difficult to heat the entire tray by flame and for this reason the previously described technique of using hot water rather than flame to soften the envelope prior to modulation may be followed. When heating and softening the tray it is helpful to use a plastic block corresponding to the arch of the teeth over which envelope tray 41 may be placed. Thus, when heated and softened, tray 41 will nonetheless retain its shape because of its resting on the complementary block. Because of the large area of the tray, strips such as 34 and 35 of FIG. 7 may be used advantageously where needed for structural firmness and support of the tray.

In all cases it is understood that the above-described arrangements and methods are simply illustrative of a small number of many possible specific embodiments and processes which can represent applications of the principles of the invention. Numerous and varied other arrangements and methods can readily be devised in accordance with said principles by those skilled in the art without departing from the spirit and scope of the invention.

What I claim is:

1. A dental device for use in taking a bite or impression or both, comprising a thin sheet of bite wax and a metal foil wrapped around said sheet of wax and including a sheet of cloth gauze disposed between a face of said wax sheet and a face of said metal foil.

2. A device as recited in claim 1 wherein said device is in the form of a full tray.

3. A device as recited in claim 1 wherein said metal foil is not flammable.

4. A dental device comprising an element of material deformable by mechanical pressure and capable of maintaining its deformed shape after said mechanical pressure is removed, means affixed to said element for maintaining dental impression material in an adjacent spatial relation to said element, and wherein said element is in the form of a sheet and said means comprises at least one thin strip of metal with a plurality of holes punched into said strip along at least a portion of the length of said strip, said strip being affixed to said sheet along one of the edges of said sheet.

5. A dental device for use in taking a bite or impression, or both, comprising adjacent layers of soft dental bite wax and hard dental inlay wax, and a sheet of metal foil disposed between said layers and wrapped about said bite wax layer, and including a sheet of cloth gauze disposed between said bite wax layer and said sheet of metal foil.

6. A method of taking a combined bite and impression using a bite and impression envelope comprising the steps of placing the envelope between the upper and lower teeth of a patient, forming a demarcation of the occlusal surfaces of said teeth in said envelope, conforming the two flanges of the envelope to the lingual and labial surfaces respectively of the teeth of interest, removing the envelope from the patient's mouth, completely covering the deformed envelope with dental impression material, reinserting the impression material covered envelope in its former position in the patient's mouth, conforming said dental impression material to said occlusal, lingual and labial surfaces, waiting until the impression material dries, and then removing the impression material covered envelope from the patient's mouth.

7. A method of taking a bite using a device comprising a thin element of bite wax covered with metal foil wherein said element has a central portion and two side portions with said central portion disposed therebetween, comprising the steps of conforming one face of said device to the occlusal surface of at least two of a patient's teeth, conforming another face of said device to the patient's opposing teeth, and conforming the major area of said two side portions of said device to the lingual and labial surfaces respectively of said first mentioned teeth.

8. A method of taking a bite using a device comprising a thin element of bite wax covered with metal foil comprising the steps of conforming one face of said device to the occlusal surface of at least two of a patient's teeth, conforming another face of said device to the patient's opposing teeth, and conforming two portions of said device to the lingual and labial surfaces respectively of said first mentioned teeth, and covering at least a portion of said device shaped in accordance with said steps with dental impression material.

References Cited in the file of this patent

UNITED STATES PATENTS

| | | |
|---|---|---|
| 1,778,293 | Galasso | Oct. 14, 1930 |
| 2,183,624 | Schwartz | Dec. 19, 1939 |
| 2,572,117 | Dennis | Oct. 23, 1951 |